Dec. 4, 1934.          N. H. DAVIS          1,983,122
BRAKE BEAM AND METHOD OF MAKING THE SAME
Filed April 12, 1932    2 Sheets-Sheet 1
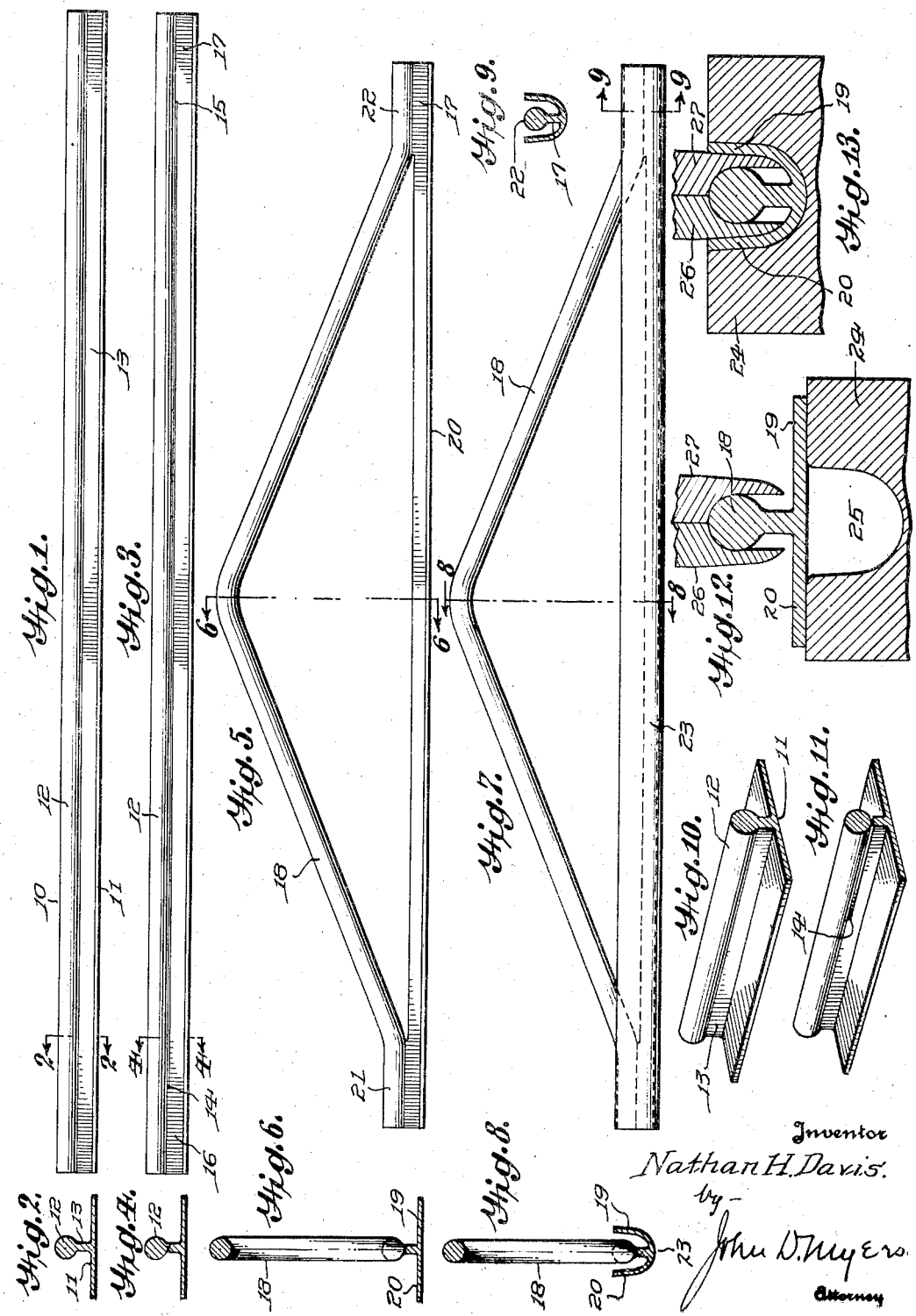

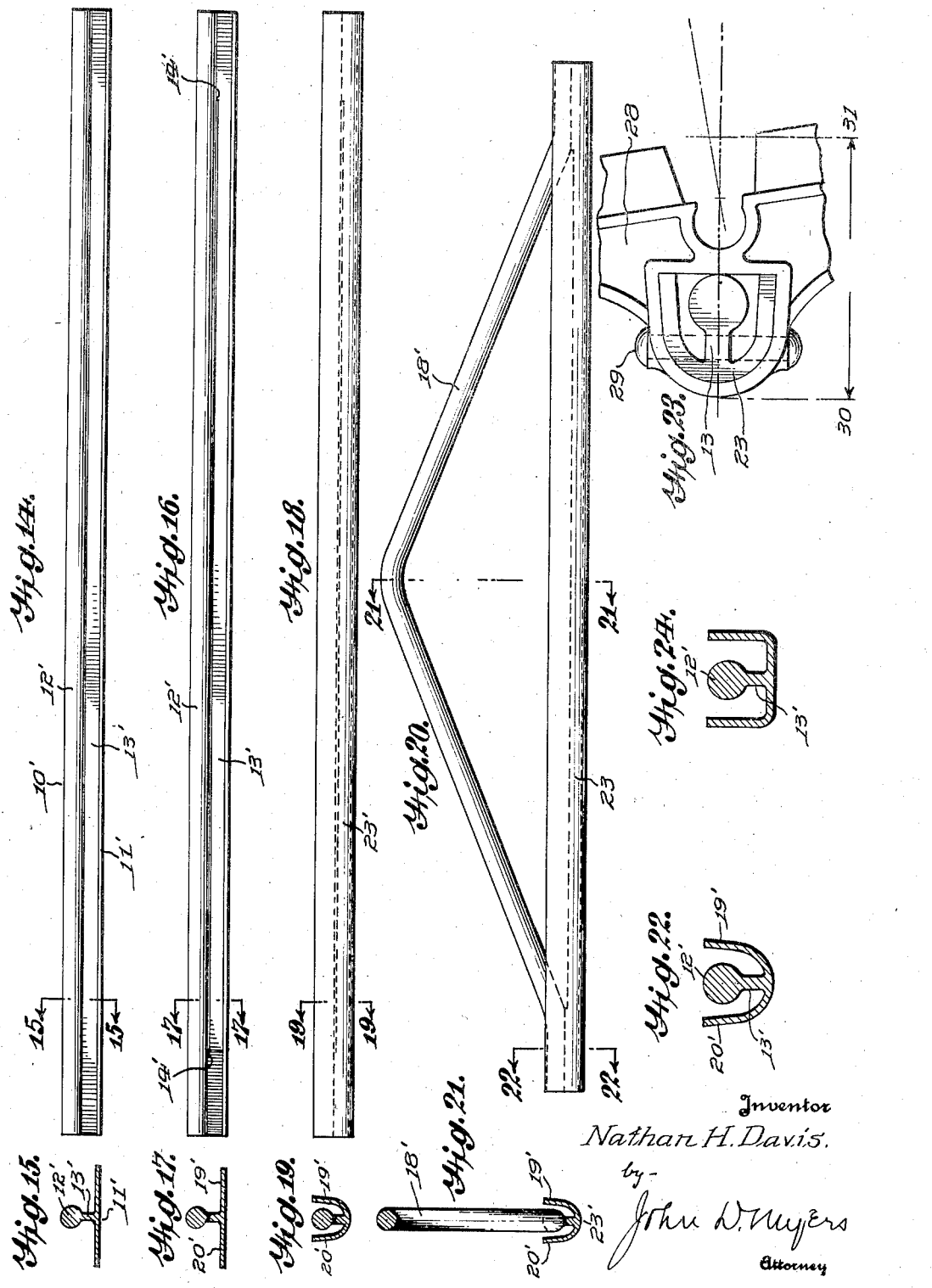

Patented Dec. 4, 1934

1,983,122

UNITED STATES PATENT OFFICE 1,983,122

BRAKE BEAM AND METHOD OF MAKING THE SAME

Nathan H. Davis, Philadelphia, Pa.

Application April 12, 1932, Serial No. 604,682

8 Claims. (Cl. 29—152)

This invention relates to a truss construction for use in railway brake beams or similar structures, and to the method of making the same.

Brake beams heretofore used are of two general types. In one type the compression member and the tension member are first formed as separate units. Corresponding ends of these members are secured together in the brake heads by extending the ends of the tension member through alined openings in the brake heads and compression member and retaining the parts in assembled relation by means of threaded nuts on the ends of the tension member. This type of brake beam has been open to the objection that the brake head must necessarily have such over-all dimensions, both vertically and horizontally, as frequently lead to difficulty in mounting the brake gear upon a railway truck. This type has also been found objectionable on account of the tendency of the tension member to break where it is threaded on the ends to receive the nuts holding the parts in assembled relation.

In the other type of brake beam heretofore used, the compression member and the tension member have been integrally connected at their ends thus avoiding some of the disadvantages inherent in the type of construction referred to above, but the beams heretofore used having integrally formed compression and tension members have likewise been open to the objection that their over-all dimensions, both vertically and horizontally, have been such as not to permit the necessary clearance between various parts of the brake gear when assembled in railway trucks, and they have lacked the resiliency essential in truss structures of this character.

It is therefore one of the objects of this invention to provide a brake beam which is practically unitary in its construction, and one which possesses the requisite strength and resiliency in structures of this character. It is a further object of the invention to provide a brake beam in which the over-all dimensions, vertically and from front to rear, are considerably less than in the brake beams heretofore known, thus affording sufficient clearance between the parts of the brake gear and the car truck when in assembled relation. A further object of the invention is the provision of a brake beam upon the opposite ends of which a single form of brake head may be utilized, thus obviating the necessity of employing "rights" and "lefts". A still further object of the invention is the provision of a brake beam of such dimensions from front to rear as to avoid the liability of the truss rod contacting with the flange of the car wheel when the truck, with the brake gear thereon, is in use. It is a still further object of the invention to provide a method whereby my improved brake beam structure may be made.

In order that the invention may be readily understood, reference may be made to the accompanying drawings in which:

Fig. 1 is an elevational view of a section of bar stock from which my improved brake beam is made;

Fig. 2 is a sectional view taken on the line 2—2 of Fig. 1;

Fig. 3 is an elevational view of the bar after the bulb has been severed from the web;

Fig. 4 is a sectional view taken on the line 4—4 of Fig. 3;

Fig. 5 is an elevational view of the bar after being upset longitudinally;

Fig. 6 is a sectional view taken on the line 6—6 of Fig. 5;

Fig. 7 is an elevational view of the bar after the flanges have been folded about the web;

Fig. 8 is a sectional view taken on the line 8—8 of Fig. 7;

Fig. 9 is a sectional view taken on the line 9—9 of Fig. 7;

Fig. 10 is a perspective view of an end portion of the bar as shown in Fig. 1;

Fig. 11 is a perspective view of an end portion of the bar as shown in Fig. 3;

Figs. 12 and 13 are sectional views showing the manner in which forming dies may be utilized for folding the flanges of the bar about the web;

Figs. 14 to 21 show the successive steps utilized in making my improved brake beam by a modified method, the showing in Figs. 14, 15, 16 and 17 being similar to the showing in Figs. 1, 2, 3 and 4;

Fig. 18 is an elevational view of the bar with the flanges folded about the web and the partially severed bulb;

Fig. 19 is a sectional view taken on the line 19—19 of Fig. 18;

Fig. 20 is an elevational view of the bar after being upset longitudinally;

Fig. 21 is a sectional view taken on the line 21—21 of Fig. 20;

Fig. 22 is a sectional view taken on the line 22—22 of Fig. 20;

Fig. 23 is an end elevation of my improved brake beam with a part of a brake head mounted thereon, and Fig. 24 is a sectional view showing a modification of the shape of the compression member.

In making my improved brake beam I utilize a bar 10 of rolled stock comprising a base portion 11, a bulb portion 12, and a web 13 connecting the bulb and the base portions. In order that the bulb may be separated from the web portion and the central portion of the bulb deflected to form the tension member of the beam, I prefer to sever the bulb from the web along a line between the points 14 and 15 as shown in Fig. 3. The end portions 16 and 17 of the web not being severed, these portions serve to integrally connect the ends of the bulb to the ends of the base portion 11.

By a suitable upsetting operation the base and web portions of the bar are then compressed longitudinally and thereby reduced in length, and the central portion of the bulb is simultaneously deflected laterally from the web into the shape shown in Fig. 5 to thereby form the tension member 18. Other methods of reducing the length of the base and web portions may be employed, such as providing a bend or corrugation therein, or cutting away a central section, but I have found the upsetting method to be preferable.

The outwardly extending flanges 19 and 20 of the base portion 11 of the bar are then folded about the web portion 13 and the ends 21 and 22 of the bulb to form the compression member 23 and to thereby complete the shape of the brake beam as shown in Fig. 7. This latter operation is preferably performed by means of forming dies of the general type shown in Figs. 12 and 13 wherein the partially formed beam is supported upon a forming die 24 with the bulb and web portions extending longitudinally over a channel 25 therein and the flanges 19 and 20 resting upon the upper face of the forming die alongside the channel 25. The punch member of the die is preferably made of two mating parts 26 and 27 in order that it may be readily assembled in engagement with the tension member 18 after this member has been deflected from the base portion 11 as shown in Fig. 5.

By the process heretofore described it will be apparent that a unitary truss for a brake beam is produced comprising a channel-shaped compression member having a rib extending longitudinally thereof and integrally connected therewith throughout the length of the channel member, and it will be noted that the tension member is integrally connected with the compression member by means of the unsevered portions of the web. The integral rib constitutes a strengthening means for the compression member throughout its entire length and serves to connect the ends of the tension member to the compression member.

In the modified process disclosed in Figs. 14 to 21 the bar 10' is similar in all respects to the bar 10 heretofore described and the bulb portion 12' is severed from the web 13' along a line 14' and 15' as shown in Fig. 16, while the flanges 19' and 20' on the base member 11' are folded about the web portion 13' and the bulb portion 12' before the longitudinal upsetting operation is effected. The folding of the flanges 19' and 20' may be effected by means of forming dies substantially like those shown in Figs. 12 and 13, thereby forming a channel-shaped compression member 23', following which the longitudinal upsetting operation reduces the length of the compression member 23' and the web portion 13', and the bulb portion 12' is simultaneously deflected laterally to form the tension member 18'. By this modification of the process the resulting beam is similar in every respect to the beam which results from the practice of the process shown in Figs. 1 to 9.

While I prefer to fold the flanges of the base member into a compression member which is substantially U-shaped in cross section, the channel member constituting the compression member may have its side walls angularly connected to the bottom wall as shown in Fig. 24 or other forms of this channel member may be utilized if desired. I have shown the compression member as being straight from end to end. It will be understood that it may be cambered to such extent as may be desired in the completed structure with the usual strut assembled therein.

As shown in Fig. 23 of the drawings, the brake head 28 is secured to the end of my improved beam by means of a bolt or rivet 29 passing through alined openings in the head, the side walls of the compression member 23 and the web portion 13. Inasmuch as my improved construction avoids the necessity of providing an opening through the head for the reception of the threaded end of the angularly arranged tension member, a single design of brake head may be utilized for the opposite ends of the beam, thereby obviating the necessity for providing "rights" and "lefts" as must be done with built up trusses. By the use of my improved brake beam I am able to eliminate various projecting portions inherent in the structures heretofore known, and to thereby reduce the over-all height as well as the depth through the beam and head in the general direction as shown by the line 30—31 in Fig. 23. This reduction of the over-all dimensions of the beam and the assembled beam and head is of importance in that it provides the necessary clearance to permit the beam to be utilized with car trucks as now commonly used in which the dimensions of portions of the trucks are increased from time to time in order to give the requisite strength. In addition to reducing the dimensions of the beam and securing this clearance, my improved structure provides a beam of increased strength over the integrally constructed beams heretofore known. By providing the strengthening rib for the channel-shaped compression member, I obtain the advantages inherent in the channel form of beam as well as the added strength furnished by the integral rib. This permits of a reduction in size of the compression member without a corresponding reduction in its strength and resiliency.

While I have disclosed the preferred form of my improved brake beam together with a modified form thereof, and the preferred method by which the same may be made as well as a modification of the preferred method, my invention is not limited to the details of construction and practice of the method herein described and illustrated, it being understood that such departures may be made from the disclosure as fall within the spirit of my invention as hereinafter claimed.

What I claim and desire to secure by Letters Patent is:

1. A brake beam comprising a channel-shaped compression member having a longitudinal strengthening rib integral therewith and extending from end to end within the channel, and a tension member having the ends thereof within said channel and integrally connected with said strengthening rib.

2. A brake beam comprising a channel-shaped compression member, a strengthening rib integral therewith and extending from end to end within the channel of the compression member, the compression member and rib being upset longitudinally, and a tension member deflected laterally from the compression member and having its ends integral therewith within said channel.

3. A brake beam comprising a channeled compression member, U-shaped in cross section, and a tension member circular in cross section having its ends within the channel of the compression member and integral therewith.

4. The method of making a brake beam from a bulb and flange bar having an inter-connecting web, comprising the steps of severing the bulb from the web intermediate the end portions of the bar, upsetting the bar longitudinally and simultaneously deflecting the central portion of the bulb laterally to form a tension member, and folding the flanges laterally about said web and the ends of said tension member to form a channel-shaped compression member.

5. The method of making a brake beam from a bulb and flange bar having an inter-connecting web, comprising the steps of severing the bulb from the web intermediate the end portions of the bar, folding the flanges laterally about the web and bulb to form a channel-shaped compression member, upsetting the compression member longitudinally and simultaneously deflecting the central portion of the bulb laterally to form a tension member.

6. The method of making a brake beam from a bulb and flange bar having an inter-connecting web, comprising the steps of severing the bulb from the web intermediate the end portions of the bar, deflecting the central portion of the bulb laterally to form a tension member, and folding the flanges laterally about the web and the end portions of the tension member to form a channel-shaped compression member.

7. The method of making a brake beam from a bulb and flange bar having an inter-connecting web, comprising the steps of severing the bulb from the web intermediate the end portions of the bar, deflecting the central portion of the bulb laterally to form a tension member and correspondingly decreasing the length of the bar, and folding the flanges laterally about the web and the end portions of the tension member to form a channel-shaped compression member.

8. The method of making a brake beam from a bar having a bulbed base portion with outwardly extending flanges thereon, comprising the steps of severing the bulb from the base intermediate the end portions of the bar, deflecting the central portion of the bulb laterally from the base portion to form a tension member and correspondingly shortening the base portion, and folding the flanges laterally about the base portion and the ends of said tension member to form a compression member.

NATHAN H. DAVIS.